(12) United States Patent
Stankoulov et al.

(10) Patent No.: US 7,043,357 B1
(45) Date of Patent: May 9, 2006

(54) EXTENSIBLE NAVIGATION SYSTEMS

(75) Inventors: Pavel Stankoulov, San Diego, CA (US); Kent Qing Pu, San Diego, CA (US)

(73) Assignee: Infogation Corporation, San Diego, CA (US)

( * ) Notice: Subject to any disclaimer, the term of this patent is extended or adjusted under 35 U.S.C. 154(b) by 0 days.

(21) Appl. No.: 11/219,288

(22) Filed: Sep. 2, 2005

Related U.S. Application Data

(63) Continuation of application No. 10/602,326, filed on Jun. 23, 2003, now Pat. No. 6,978,206.

(60) Provisional application No. 60/389,447, filed on Jun. 21, 2002, provisional application No. 60/390,484, filed on Jun. 21, 2002.

(51) Int. Cl.
  *G06F 17/00* (2006.01)
  *G01C 21/26* (2006.01)

(52) U.S. Cl. ............ 701/200; 701/210; 701/211; 709/201; 709/219; 707/10; 707/104.1

(58) Field of Classification Search ......... 701/200, 701/201, 208, 209, 210, 212, 213; 709/201, 709/217, 218, 219, 205; 707/103 R, 103 X, 707/104.1, 10.202; 340/995.13, 995.19, 340/995.23, 995.12; 715/764
See application file for complete search history.

(56) References Cited

U.S. PATENT DOCUMENTS

| | | | |
|---|---|---|---|
| 6,208,935 B1 * | 3/2001 | Yamada et al. ............. | 701/209 |
| 6,347,332 B1 * | 2/2002 | Malet et al. ................ | 709/205 |
| 6,621,505 B1 * | 9/2003 | Beauchamp et al. ........ | 715/764 |

* cited by examiner

*Primary Examiner*—Tan Q. Nguyen
(74) *Attorney, Agent, or Firm*—Joe Zheng

(57) ABSTRACT

Computer-assisted navigation is achieved with component-oriented programming and instructions that provide a distributed component programming navigation system. The computer-assisted navigation is achieved with a computing device including a logical data model configured to provide abstract interfaces in a process to convert a format and data model of a provider to an appropriate format and data model suitable for the computing device, wherein the process occurs on demand, only when needed, or the conversion occurs in accordance with the format and data model of the provider, and at download time or at an initial processing time. As a result, such a computing device can be advantageously used many environments including a distributed navigation system.

23 Claims, 10 Drawing Sheets

— 1 —

EXTENSIBLE NAVIGATION SYSTEMS

REFERENCE TO PRIORITY DOCUMENT

This application is a continuation of application Ser. No. 10/602,326, filed Jun. 23, 2003, now U.S. Pat. No. 6,978,206 claims the benefit of priority of U.S. Provisional Patent Application Ser. No. 60/389,447 entitled "Distributed Navigation System", filed Jun. 21, 2002 and Ser. No. 60/390,484 entitled "Distributed Navigation Data Management System", filed Jun. 21, 2002. Priority of the filing dates of Jun. 21, 2002 are hereby claimed, and the disclosures of the Provisional Patent Applications are hereby incorporated by reference.

BACKGROUND

1. Field

The present invention relates generally to navigation systems and, more particularly, to wireless navigation information systems.

2. Description of the Related Art

With the introduction of greater geographic coverage and higher bandwidth wireless connections, wireless carriers and telematics service providers are expected to provide greater functionality and utility in their services. Telematics offers location-based voice and data communication tools to mobile users, and provides "smart" information tailored to user location and purpose of the task. The wireless carriers and telematics service providers focus primarily on navigation devices and systems that provide services and functionality based on a knowledge of the current and/or expected geographic location of the mobile device or user.

The navigation systems generally operate within a navigation area and rely on an ability to find and use locations and connectivity within a map database of the navigation area. Most of the navigation map databases include at least geographic information for major road networks, and will often include additional route information relating to minor roads, road connectivity and accessibility (e.g., one-way streets, turn restrictions at junctions, and other related parameters), road shape information, a database of road names, building number ranges, and points of interest, such as restaurants and shopping malls. Navigation systems can be categorized into either standalone devices, which may optionally have some network connectivity, or server-based systems providing services to low capability devices or thin-client devices such as cell phones.

Recently, some of the most popular of the location-aware standalone devices have been navigation systems installed in vehicles, either by the vehicle manufacturer, or by a dealer as an after-market product. These are typically closed, proprietary systems that include a navigation computer, a display, a means for user input, and some form of bulk data storage device, such as a CD or DVD containing a map database. Commercial navigation map databases are generally proprietary both in terms of the actual physical storage format as well as the access mechanism (e.g., an Application Programming Interface (API) specification) that allows a navigation application of the navigation computer to read and process the data.

The user can enter or select an address of interest and can use the map database to convert the addresses into geographic map positions. These may then be used to generate routing information from an initial geographic location to the map position of interest. In combination with information from various vehicle sensors, for example Global Positioning System (GPS) receivers, gyroscopes, and speed pulse generators, the routing information can then be used to guide the user along the route, giving suitable visible and audible instructions for maneuvering. The map database may also be used to render a map display to the user on a suitable display device.

Such standalone systems, however, are constrained by the content and volume of the map database that, due to space limitations, might not include dynamic characteristics of the road network such as the effect of traffic, weather, or other road conditions. Navigation quality is also limited by the relatively static nature of the database. Due to the logistics involved in creating and distributing CD's and DVD's, standalone systems might only be updated a few times per year with data that could already be several months old when the distribution media is created. Furthermore, because of the generally proprietary nature of the map data, the end user usually only has a single source for the map data, and is therefore also subject to the limitations of the supplier's ability to generate navigation quality data.

Server-based systems have been providing navigation-style services to end users. These services can range from Internet-based systems such as the "MapQuest"™ mapping service accessible through web browsers, to services provided via an operator at a telephone call center, such as those provided by the "OnStar"™ vehicle navigation service. While these services maintain the benefit of having a central map database, which can be kept up-to-date much more readily than standalone systems, the lack of direct local access to this central map database from the client device reduces the overall system functionality. Typically, these services perform most of the data access and information processing, such as route calculation, on the server and then provide the results, in some simple form, to the client device.

For map display, a simple image is typically provided in either raster or vector form to a display device. While a simple image is generally sufficient for rendering the image to a display device, it usually lacks sufficient additional information to enable it to be used for navigation purposes and connectivity information. In the case of the "OnStar"™ service, for example, routes are provided to the client as simple sets of text instructions that are read to the user over a cellular voice call, while map displays are typically provided by sending raster images, or simple vector images. However, neither text instructions nor raster images can provide attribute or connectivity information for the road network.

It should be apparent from the discussion above that current navigation systems employing telematics services could benefit from greater capability and flexibility. Thus, there is a need for an improved navigation system. The present invention satisfies this need.

SUMMARY

Computer-assisted navigation is achieved with component-oriented programming and instructions that provide a distributed component programming navigation system. In one aspect, the computer-assisted navigation is achieved with a computing device having program memory that includes a component-oriented application. Operationally, the component-oriented application provides a distributed navigation system comprising a User Interface component, a Service Manager component, a User Positioning category of components that provides a user position based on navigation sensor data, and a Mapping category of components that accesses a map database and places the user position on a road segment of the map database, wherein the components within the component-oriented application are managed by the service manager to perform distributed navigation services.

In another aspect, the distributed navigation system includes a request and response mechanism for data messages. The request and response mechanism provides techniques to process request messages generated by a client user. The techniques include interpreting the request messages, dispatching calls to request event handlers to handle the request messages, preparing a response to the request messages such that distributed navigation data is collected and processed, and processing response messages sent from a server to a client. The client can process the received navigation data in the response into a user-presentable form.

Other features and advantages of the present invention should be apparent from the following description of the preferred embodiment, which illustrates, by way of example, the principles of the invention.

DETAILED DESCRIPTION

Figure 1:
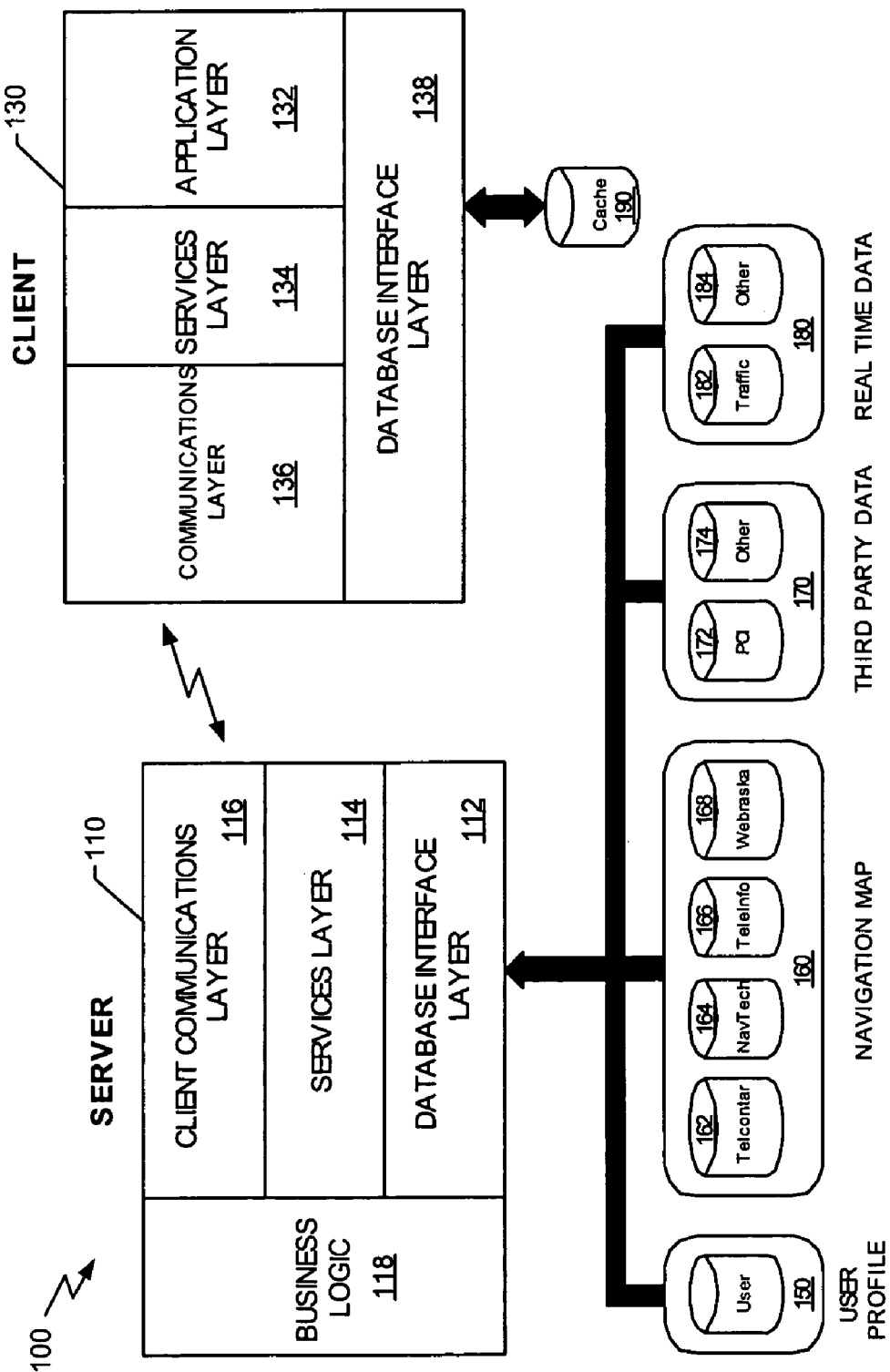
FIG. 1 is a block diagram of a distributed navigation system in accordance with an embodiment of the present invention.

Exemplary embodiments are described for a distributed computing solution combining intelligent client devices with local caching, and with processing capabilities for wireless connectivity, and server systems that, in combination, provide a navigation system with expanded quality and functionality for services offered to mobile users. Aspects of the embodiments involve distributed navigation, system architecture, messaging protocol, high-level data management, and enhanced telematics services. In particular, the exemplary embodiments involve systems and techniques that provide services and functionality based on knowledge of the current and expected geographic location of the mobile device or user.

The exemplary embodiments of the distributed navigation system described herein provide the ability to combine an intelligent client with a back-end server system to the same functional performance, but richer functionality, than can be provided by a standalone navigation system. In the distributed navigation system, information is intelligently cached at the client, which can then decide whether it can service functionality requests locally from that data, or whether it will make a request to a server for data or services. The specified functionality can also be provided by a blend of local and remote services, and data responses.

The distributed navigation system includes a request-response model that is layered to isolate the underlying map database from access and service layers, as well as the external interface (i.e., the effective user interface). As described further below, the main entity of reusability in the architecture of the disclosed distributed navigation system is the service model, which is generally of the same configuration on the client as well as on the server, although the implementation technologies can be different. The service model provides services that are configured as components that perform tasks and are managed by a service manager component, in accordance with the component programming data model that will be known to those skilled in the art, as will be described further below. Thus, each service supports one or more interfaces that describe the profile for the tasks that the service performs. The service profile is a programming object that can be defined externally or read from a file, and that describes how the service should be executed (e.g., number of instances, threading model, etc.). Each service is also associated with a configuration that is specific for each service.

The distributed navigation system includes services that can be logically separated into several service groups or modules that include: Navigation Common services, Navigation Distributed services, and Messaging services. The Navigation Common services perform navigation tasks that are common between standalone and distributed modes of the navigation system (e.g., a Vehicle Positioning service). These services can be used on both standalone and distributed modes without any code changes. The services need change in the configuration only. The Navigation Distributed services include services that are specific only for the distributed mode of operation. Most of these services have a standalone mode service implementation counterpart (e.g., Route Calculation service). Some of the services are applicable only for the distributed mode of operation (e.g., Server Communication service). The Messaging services are a special kind of service that provide internal communication using the message handling mechanism. These services are used as message adapters for the actual navigation services. For example, the Vehicle Positioning (VP) service includes a VP Messaging service, which sends messages to the other services in the system depending on the output of the VP service. The VP Messaging service also receives messages from the rest of the system and passes the message data as a service input. The messaging service is optional. In some configurations, the messaging service is substituted with direct function calls through a central service manager. For some system configurations, direct function calls will have reduced operating overhead.

The map database preferably includes geometry, connectivity, and attribute information for the road network with respect to which the navigation system will provide route and location information. The map database information preferably includes street names, road classifications, speed limits, restrictions on intersections by time or direction, as well as address information for streets (e.g., names, building numbers, and other related information), and points of interest (POI) classified by category, name, or other related parameters.

A master database resides on the server, or on one or more servers, each of which is logically partitioned using a set of defined schemas that are known to both clients and servers. The schemas are versioned and defined such that new versions may be provided to the client and can be readily integrated, in accordance with component programming techniques. These partitions, or database parcels, are downloaded to the client device on request as the client moves around within the mapped area. The client maintains the cache based on both the historical user driving as well as the expected driving. For example, the client can maintain the parcels that contain the area through which the client user commonly drives as well as parcels that match a route that has just been calculated.

The parcel size is generally limited by the bandwidth of the connection (usually a wireless connection) between client and server. In order to alleviate the bandwidth limitation, and the likelihood of a dropped connection while downloading a parcel, the contents of the parcel is ordered. The parcel is then sent in such a way that the client can begin to operate on the data as soon as it arrives. If a dropped connection should occur, then retransmission may begin from the failure point rather than at the beginning of the parcel data set.

An enhanced set of address and POI information can be held on the server due to limitations of data space. The server can also have the ability to access third party data repositories for similar data. Traffic data, both real-time flow information and historic data, can also be managed between client and server. The traffic data can be used for routing and guidance functionality. Moreover, with client vehicle traffic information from a sufficient number of client vehicles, instant traffic flow data can be generated using the predictive technique.

The distributed navigation system may also be integrated with vehicle diagnostic systems to add more information about the driving characteristics, which may include balance of freeway against urban driving, typical journey duration, distance, and other related information. This information may be collected automatically through a wireless connection to provide auto-manufacturers and the end users with enhanced warranty and service capabilities. This may also provide advantages for the insurance industry. For commercial applications, the system can enable vehicle position logging to a high degree of accuracy, continuously or on demand.

A block diagram of an exemplary distributed navigation system 100 constructed in accordance with the invention is illustrated in FIG. 1. The block diagram shows client 130 and server 110 components configured as layered structures having defined interfaces between layers in each structure. In particular, the client 130 and server 110 devices execute program instructions that support a component programming environment and execute respective client and server software to provide the operation space in which these respective layers function. In addition, it should be understood that multiple servers and multiple clients can operate as part of the system 100, and the layered components of the system 100 operate in accordance with component programming principles. Therefore, although the system 100 will be described with reference to a single client 130 and a single server 110, it should be understood that the system can also include multiple clients and multiple servers, and the description applies to such multiple configurations.

FIG. 1 shows that the server component 110 includes a Database Interface Layer 112, a Services Layer 114, and a Client Communications Layer 116. The Database Interface Layer 112 provides access to various data repositories, such as a User database 150, a Navigation Map database 160, Third Party Data 170, and a Real-Time Data component 180. In one embodiment, the Database Interface Layer 112 is capable of supporting multiple data vendors of these data repositories in order to provide maximum flexibility to the service provider, and to take advantage of the "best" data for each geographic area.

The User database 150 supplies user profile information, as well as providing a repository for account and billing data. The Navigation Map database 160 provides the navigation-specific static data for geocoding, routing, and map rendering from third party navigation map sources, which are indicated in FIG. 1 as vendors such as "Telcontar" 162, "NavTech" 164, "Teleinfo" 166, "Webraska" 168, and other related sources. The Third Party Data component 170 can be integrated, and can supply enhanced Point of Interest (POI) data 172, such as Yellow Pages business directories or restaurant guides, or other related data 174. The Real-Time Data 180 may include traffic 182 and other related data 184. The Real-Time Data component 180 may be provided as an information service to the client 130, and may also be used as part of other services. For example, traffic flow and incident information can be factored in to a route generation service that calculates the best route given the current or expected road conditions.

The Services Layer 114 prepares individual or combined services from collected data and requests from the client 130, and provides the services to the client application. For example, these services may include geocoding and/or routing computations. The Business Logic layer 118 ensures adequate system metrics are collected from and provided to the other layers 112, 114, 116, to ensure that all the accounting requirements are fulfilled.

The client 130 includes an Application Layer 132, a Services Layer 134, a Communications Layer 136, and a Database Interface Layer 138. The Database Interface Layer 138 provides access to a local cache 190, which is a subset of the master database stored across the server(s) 110 and is accessed through the server Database Interface layer 112. The client cache 190 typically stores information related to the current and expected locations of the client device 130.

The Services Layer 134 of the client provides individual or combined services, as desired, that are provided to the client application. The provided services are likely to be different from those available on the server 110, because the services provided on the respective devices can include services unique to the functionality of the device. For example, a position matching service is a service type needed for a mobile client whose position will change over time but is not needed for a fixed server, whereas an account management service is a service type needed for a server as part of access authorization processing and billing but is not needed for a client device.

The Communications Layers 116, 136 in the server 110 and client 130, respectively, are responsible for managing the communication between the client and the server. Thus, the Communication Layers 116, 136 must take into account the limitations and characteristics of the connection between the client 130 and server 110, which might sometimes exhibit a relatively low bandwidth and therefore might be subject to drop outs in communication as the client device 130 moves in and out of wireless coverage areas relative to the server 110.

Component Model

Figure 2:
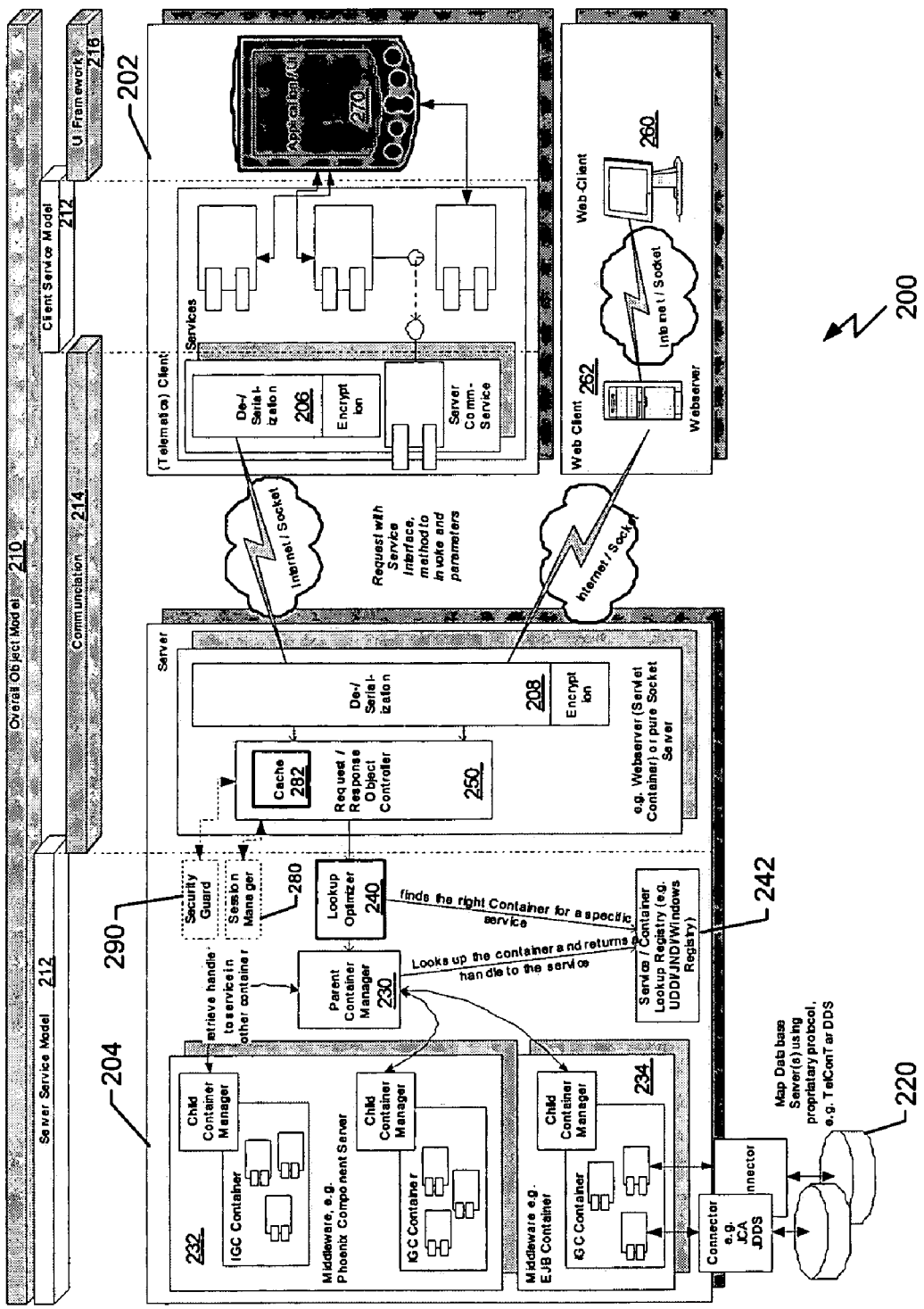
FIG. 2 is a detailed block diagram of the distributed navigation system in accordance with another embodiment of the present invention.

FIG. 2 is a detailed block diagram of the distributed navigation system 200 constructed in accordance with the present invention. FIG. 2 illustrates the architecture of the service and communications layers of the client 202 and server 204 based on an overall object component model 210, which can be broadly divided into client and server service models 212, communication models 214, and a user interface framework 216.

In the illustrated embodiment of FIG. 2, the architecture of the distributed navigation system 200 is based on a component-programming model used consistently across all development platforms within the system 200.

In general, a component from the component model is an object (in the classical Object-Oriented programming (OOP) sense) whose internal state is accessed only through one or more public interfaces. The interface architecture is similar to a class, which may contain only a method's signatures, but contains no bodies or data members. Most of the modern object oriented languages have a concept of interface. In C++ this concept is called a pure abstract class, i.e., all functions are virtual and abstract. In the Java programming language, C#, and the like, the concept is implemented with specific language keywords. Methods declared in the interface are abstract methods and one class could implement multiple interfaces. The advantage of components is that their implementation is not visible to the "outside world". Rather, components are like "black boxes" that can be only accessed through the exported interfaces. Building a system of components makes it much more flexible, reusable, and manageable.

Figure 8:
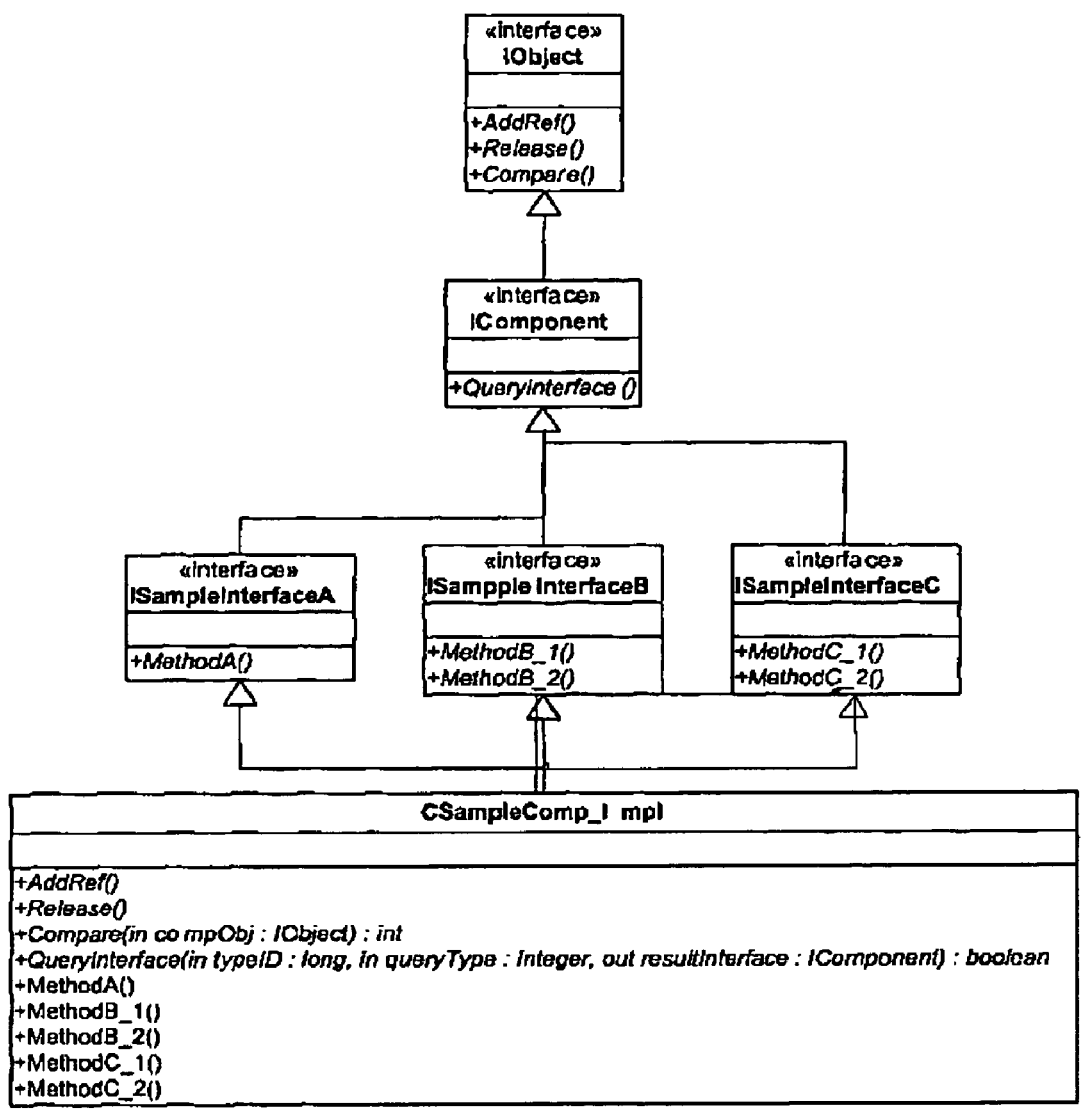
FIG. 8 is an illustration of a programming component for the object model of the system implementation.

FIG. 8 shows an example of a component called CSampleComp_Impl. This component CSampleComp_Impl is a sample class that implements the component functionality. It derives from three interfaces—ISampleInterfaceA, IsampleInterfaceB, and ISampleInterfaceC, which derive from the IComponent interface. The IComponent interface is the main interface that each component interface derives from. It provides a mechanism to query for other interfaces supported by the component. This is performed through a QueryInterface method that accepts an interface ID as a parameter and returns a reference to the requested interface. The function returns a "true" value if the requested interface is supported (implemented) by the component, otherwise the function will return "false". In some languages, such as Java or C#, this mechanism could be implemented using the language defined features for dynamic type casting. In this case, the IComponent interface will be just a marker interface.

The IComponent interface shown in FIG. 8 derives from an Object interface that defines a mechanism for reference counting (AddRef, Release methods). It also defines a generic comparison method (called Compare) that is implemented by each object. The reference counting mechanism can be omitted in languages that have a garbage collection mechanism (such as C#, Java, etc.), but is very useful for languages such as C++ where memory and object lifetime should be managed manually.

Returning to FIG. 2, those skilled in the art will understand that the component data model provides a uniform set of programming rules and guidelines that are used regardless of whether the code is developed in XML, C++, Java, or any other programming language or model that supports component-oriented programming techniques. The FIG. 2 data model provides a framework that manages component lifetime using reference-counting mechanisms and provides structures for containment and aggregation. Each component, other than simple data types, within the system is derived from a standard base class. Furthermore, functionality is described using interfaces, such as abstract base classes. Concrete implementations are derived from these abstract classes to provide the described functionality.

The component model 210 is also extended to provide support for reflection and serialization as embodied in Deserialization modules 206, 208. "Reflection" is the ability to query a component to discover the methods and member variables of each class of the component. This capability is already present in Java, and can be been provided for a C++ version by the C++ framework using macros and other advanced programming techniques. "Serialization" is the process of writing out key information of a data object to a serial data stream or communication channel, or of taking that serial data stream and reconstructing the original data object (i.e., deserialization). Serialization support is described by a number of interfaces, and any component that needs to be serialized within the system may implement these interfaces. Because the serialization is defined as a set of standard interfaces, it is possible to serialize complex components without the serializer having in depth knowledge of the specific component types. The serialization is designed to work across device, platform, and language boundaries. For example, a component on the server written in Java can be serialized, transmitted to a client, and deserialized to a client version of the component written in C++.

Logical Data Model

A review of the data models provided by various data repositories or database vendors reveals that while some of the databases are similar, most are different. Thus, the architecture of the distributed navigation system 200 is configured to be flexible enough to plug in to any access library and/or any location-aware database 220 without having to change the system architecture. Moreover, software changes are limited to the software layer immediately above the database 220.

To enable this flexibility, a Logical Data Model (LDM) has been built upon the standard overall object component model 210 to provide consistently abstracted interfaces for all components within the system 200. For each database provider, an interface layer is created to convert the format and data model of that provider into the LDM defined by the distributed system architecture of the system 200. Once this conversion has occurred, the distributed system then deals with each component using the generic LDM-defined interface. The use of interfaces allows the conversion to occur on demand, to occur only when needed, or the conversion can occur in accordance with the data type, to occur at download time or at an initial processing time.

For example, if it is assumed that a database vendor "A" defines road segments and nodes, where a node is the intersection of two or more segments, and a segment is a stretch of road between nodes, and if each of these segments and nodes has various attributes, such as speed limit and name, that describe and enable the segment or node to be used for navigation purposes, then geographic information can be provided by a sequence of latitude-longitude pairs describing the segment shape. A database vendor "B", however, might define a segment as a simple straight line that connects two latitude-longitude shape points, and also defines features that are constructed of multiple segments, and if nodes are not defined explicitly, but are implied by the intersection of multiple segments at the same latitude-longitude pair, along with attribute information of those segments.

To provide a consistent interface to each of these vendors, vendor A and vendor B, the abstraction layer of the LDM converts each segment information of the respective vendor data into a single segment component with the LDM-defined segment interface. The abstraction layer also converts node information of vendor A to a consistent component with the LDM-defined node interface. The abstraction layer then dynamically constructs node components from the segment information provided by vendor B.

Figure 10:
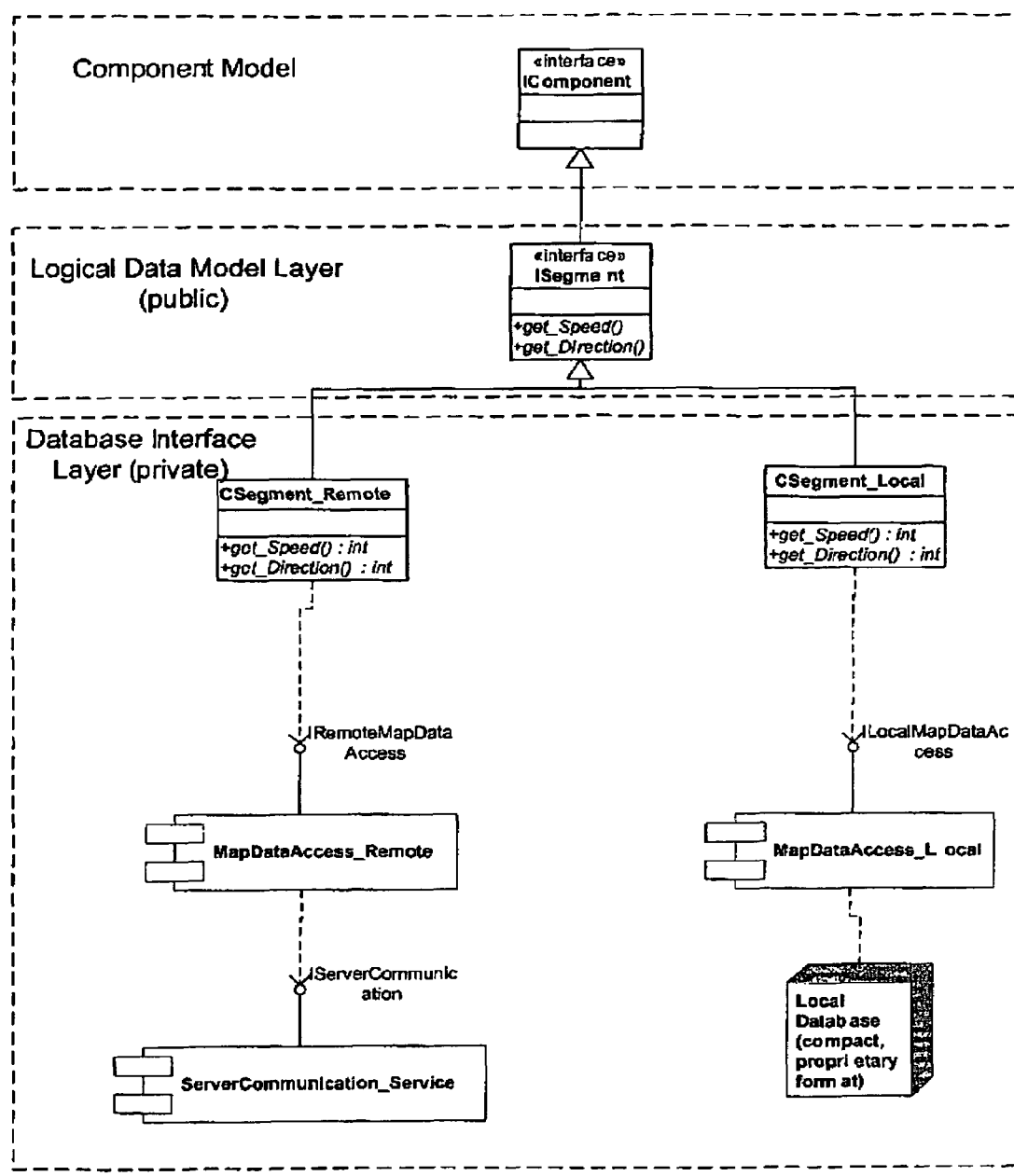
FIG. 10 is an illustration of a segment component in the Logical Data Model of the exemplary system.

FIG. 10 shows an example of the Logical Data Model's segment component. This component is defined through the generic ISegment interface. In the figure, only two methods are shown, get_Speed and get_Direction, for purposes of explanation. The real segment interface will have many more methods that give access to the segment attributes. The illustrated interface is public, i.e., accessible to all components and services that need to use it. FIG. 10 shows two implementations of this interface. The CSegment_Local implementation uses a local database to retrieve the segment attributes. The CSegmentRemote implementation extracts the data from a remote server when needed. Some of the data might be cached locally for efficiency reasons. Because of this configuration, other component users of the ISegment interface are unaware where the data comes from. All these components see and use is the generic ISegment interface. This example shows how the database abstraction layer is implemented. The system relies on public generic interfaces that define all navigation data entities, while the actual implementations are hidden in the database layer.

This service architecture allows using different database and service providers on the server side, as shown on FIG. 1—the database interface layer 112. Similarly, the same approach is applied on the client side. The client services support the same generic navigation interfaces. This is illustrated on FIG. 1 at the database interface layer 138, and on FIG. 3, described further below, at the Map Data Access Service 326.

Furthermore, this architecture allows building easily hybrid distributed navigation systems. In this type of system, route calculation will sometimes happen using the local database, and sometimes will be a request for data from a server. The database dependant services (e.g. Map Data Access 326, Route Maneuver Service 332, Name Lookup Data Access 344) will each have two implementations. One implementation of those services will read from a local database and another will obtain data from a remote server. In either case, both implementations will support the same interfaces. Thus, the rest of the system is unaware where the data comes from. The selection is controlled by the Service Manager 380.

For example, the Map-Matching service 324 will not be influenced by the format of the map data. It will depend on the generic Map Data access interface to obtain road segments and nodes. The returned segments will support generic segment and node interfaces. If the data is obtained from a server it will be cached locally in the memory. It can alternatively obtain it from a local storage from some highly compressed proprietary format. If the interfaces are met, so is the desired functionality. This case is illustrated on FIG. 10. The same principle could be extended to all services in the system and achieve very powerful, easy to manage system.

Service Model

A Service Model (SM) 212, designed to provide the model or framework of the Services Layer, is also built on the standard component model 210. Thus, each service within the distributed system 200 acts as a component, and derives from the standard base class.

The service model is based on the component model described above. Each navigation service represents a "black box" that implements one or more interfaces. The navigation interfaces are general and provider independent. The rest of the system accesses the service only through those interfaces. The universal definition of interfaces allows plugging different implementations of the same service, without changing the rest of the system.

Figure 9:
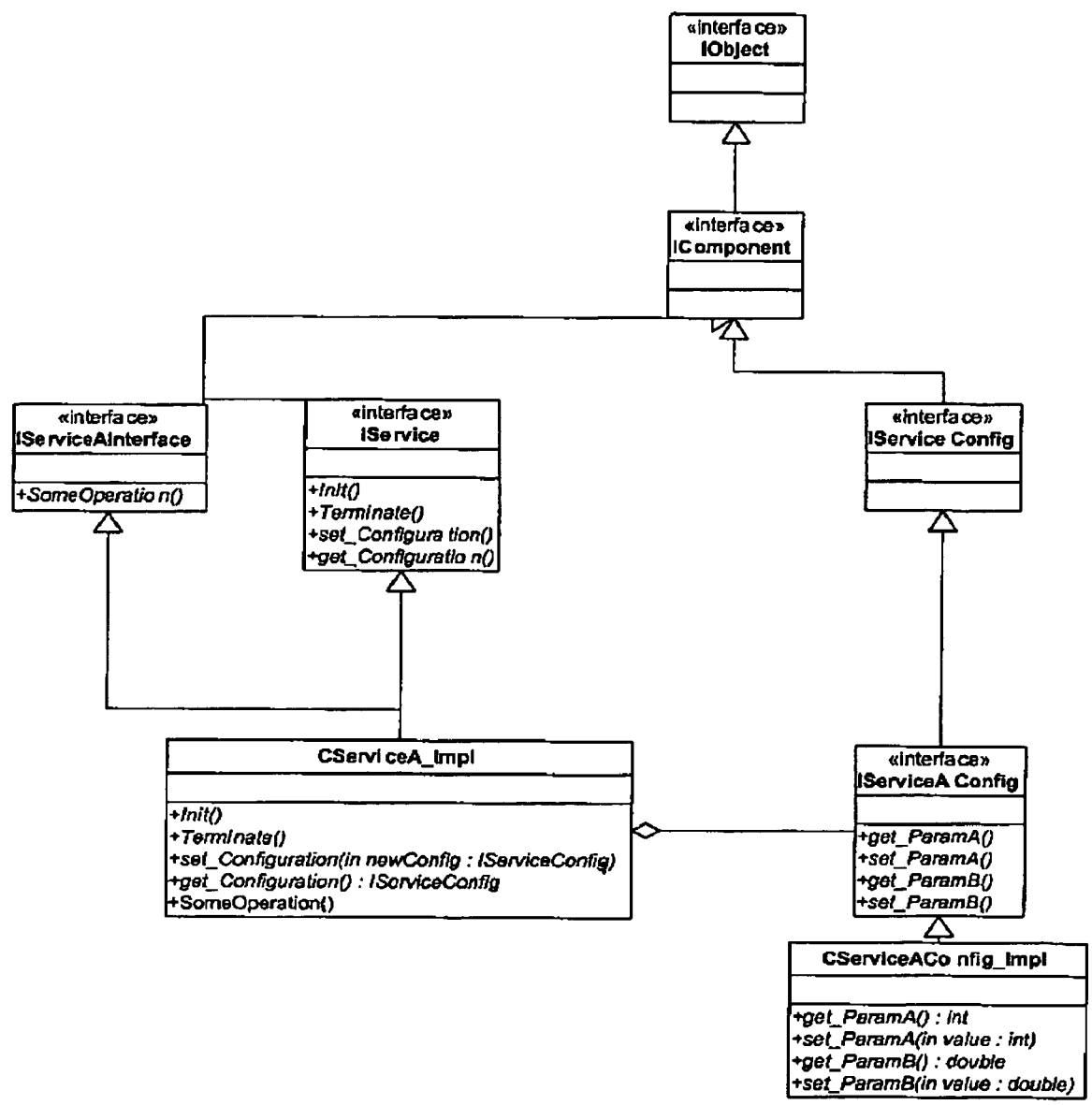
FIG. 9 is an illustration of the service model implemented in the exemplary system.

FIG. 9 illustrates a sample service static diagram and is provided for purposes of general explanation. "CService-A_Impl" is an example of a service implementation class (it implements Service "A"). It inherits and implements the methods of the two interfaces—IService and IService-AInterface. Implementing the IService interface makes a given component a service. IService interface defines the methods to initialize and terminate the service as well as to set the configuration. These methods are used by the service manager to initialize and terminate services. The set_Configuration and get_Configuration methods can be used by the other components in the system to change the configuration of a particular service. The IServiceA interface is an example of a specific interface that defines the protocol, i.e. operations available by the service. In this example the interface is derived from IComponent, but in some cases it can be derived from IService or other interfaces depending on the particular service implementation and design requirements. The QueryIntertface mechanism from the component model gives the ability to navigate between the interfaces.

The service implementation class keeps a reference to the IServiceAConfig interface. This is an interface for the configuration component specific for the exemplar service A. The CSergviceAConfig_Impl is the class that implements all of the methods of the IServiceAConfig. The configuration component usually contains parameters that are specific to the service and instruct the service how to perform its task(s). This configuration component is usually read from an external file (e.g. XML) or can be programmatically set. The services and configuration follow the configuration segregation principle (CSP). The idea is to have separation of the parts of the service that are responsible for actual functionality from the configuration. In other words, it is desired to separate the parts that are responsible for the "What" role from the parts that are responsible for the "How" role. The goal of this separation is flexibility and reusability. Following this principle allows having a service executing the same functionality in different ways or different environments without changing the service itself. All that needs to be done is to change the configuration file.

Figure 3:
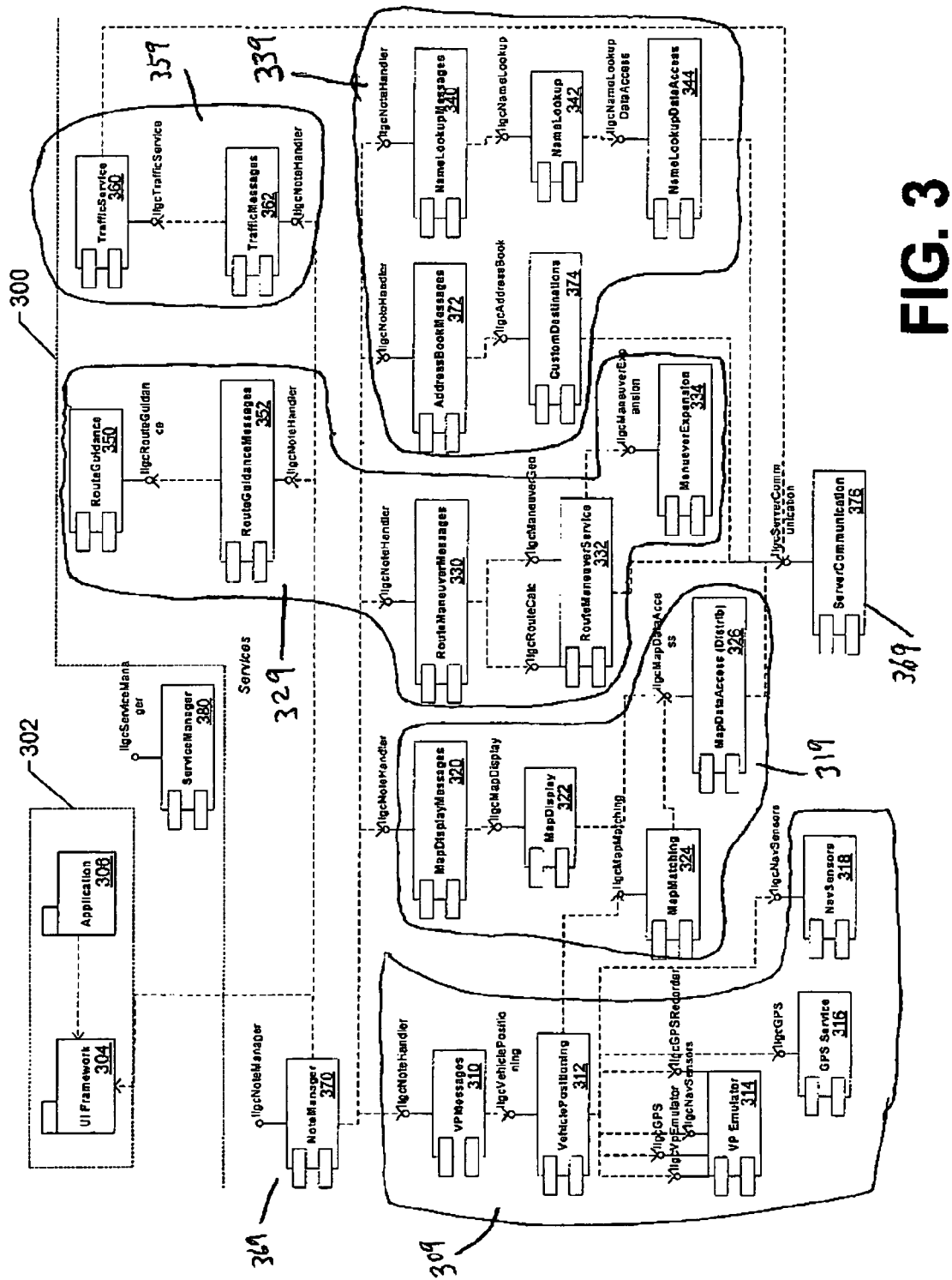
FIG. 3 illustrates an exemplary computing device service framework that interfaces with a client device or server device of the distributed system.

FIG. 3 illustrates an exemplary client device service framework 300, which interfaces externally through an interface category 302 of components that can include a User Interface framework component 304 and an application component 306. In a client device, the User Interface provides the means by which a user can configure and operate the navigation system, and usually interfaces with a data entry keyboard, mode control inputs, and data display or speaker interfaces. The application component for a client device comprises the collection of objects that are instantiated and executed on the client device to provide the client navigation services described herein. In a server device, the User Interface provides a means by which a navigation system operator can configure and install a server software version of the navigation system on a server machine, while the Application comprises the collection of objects that are instantiated and executed on the server to provide the server navigation services described herein.

Within the client device service framework 300 of the distributed navigation system, services are provided by one or more components, as illustrated in FIG. 3. The services and their corresponding components include a User Positioning service category 309 of services comprised of components 310–318, a Mapping service category 319 of services comprised of components 320–326, a Route Processing service category 329 comprised of components 330–334 and 350–352, an Address Processing service category 339 (components 340–344 and 372–374), a Traffic service category 359 (components 360–362), and an "other" related services category 369 (comprised of components 370, 376). The services register with a service manager 380 through a discovery process at start up. The service manager reads external files that describe each service profile the services also can be unregistered through the service manager API. In particular, the service manager 380 provides an interface to the client application 306 to query and receive instances of specific services. Each service has a profile that describes how the service should be executed (e.g., number of instances, threading model, etc.), as well as other static and run-time service information.

The User Positioning service 309 includes a Vehicle Positioning (VP) component 312, a VP Messages component 310, a VP Emulator component 314, a GPS service component 316, and a Nav Sensor component 318. The VP component 312 returns the current "best known" user position. The determination is based on raw GPS data from the GPS service component 316 and data from the Nav Sensor component 318. If a Map Matching component 324 is present, the VP component 312 will use the output of that component 324 to improve the quality of the user position. The VP Emulator component 314 produces raw GPS and navigation sensor data by reading the data from a pre-recorded file.

The Mapping service category 319 preferably includes a Map Matching component 324, a Map Display component 322, a Map Data Access component 326, and a Map Display Messages component 320. The Map Matching component 324 places the user position on a map database road segment. The Map Display component 322 draws a map, which includes entities representing different visible objects on the client display screen. Each entity type and its Z-order can be configured separately. The Map Data Access component 326 provides an interface to access the map databases. Thus, this implementation of the Map Data Access component 326 reads the map data from a remote server. The component is able to cache the data depending on the configuration.

The Route Processing service category 329 includes a Route Maneuver Service component 332, a Maneuver Expansion component 334, a Route Guidance component 350, a Route Maneuver Messages component 330, and a Route Guidance Messages component 352. The Route Maneuver Service component 332 provides a route from a given starting point to a destination point. The component 332 also provides maneuvers for the user along the route. The Route Maneuver Expansion component 334 expands maneuvers with detailed description of the maneuver based on the turn angle and the maneuver type. The component also associates sound files and/or bitmaps to each maneuver depending on the configuration. The Route Guidance component 350 guides the user on the route (i.e., sends notification when next maneuver is approaching), and checks if the user is on route.

The Address Processing service category 339 includes a Custom Destinations component 374, a Name Lookup component 342, a Name Lookup Data Access component 344, an Address Book Messages component 372, and a Name Lookup Messages component 340. The Custom Destinations component 374 provides a list of destinations stored on the server for the current user. The Name Lookup component 342 enables the client to perform name entries and searches on a limited name sets (e.g., street names for a given city). This component 342 provides an interface to perform next character searches. The Name Lookup Data Access component 344 provides data for the Name Lookup component 342. In the distributed mode, the data is received from the remote server.

The Traffic service category 359 includes a Traffic Service component 360 and a Traffic Messages component 362. The Traffic Service component 360 provides a real-time traffic data from a remote service.

The other related services category includes a Server Communication component 376 and a Note Manager 370. The Server Communication component provides request and response mechanism to communicate with the server. This component 376 is responsible for logging and configuration of the communication link between the client and server. The Note Manager 370 manages internal communications through messages components.

The services are also defined by standard interfaces, with concrete implementations supporting them. For example, a generic route calculation interface may be defined, and multiple route calculation components may be implemented. An application using these services may request a particular implementation, or may request a route calculation service, in which case, the application would receive the first available route calculation service instance according to the management technique implemented by the service manager 380.

The service framework 300 may be implemented with third party software to provide sufficient benefit in code reuse and cross platform compatibility. For example, in the distributed navigation system 200 of FIG. 2, the server side Service Manager 230 can be configured with the Phoenix application server 232, developed as part of the Apache Avalon Open Source project. Alternatively or additionally, the Service Manager 230 may use a commercially available Enterprise Java Bean (EJB) container 234, which is a framework for component-based distributed computing system. The architecture of the distributed computing system 200 in EJB enables the client application to include only presentation logic, referred to as a "thin" client. In this architecture, the components execute within a construct called a container, which provides an application context for one or more components and provides management and control services for the components. The Service Manager 230 may also interface with a lookup optimizer 240 and a lookup registry 242 to find an appropriate container for a specific service. Thus, as services and interaction are defined using generic concepts, it is possible to change the actual implementation without changing the architecture of the system.

Client-Server Request-Response Communication

Communication between the client 202 and server 204 is performed in the communication model 214 of FIG. 2, and is modeled on the Request-Response (RR) concept. The RR concept of the communication between the client 202 and server 204 is managed and controlled by an RR Object Controller 250 using an RR protocol in a manner similar to that used for Remote Procedure Calls (RPC). Thus, the RR Object Controller 250 makes use of the serialization capabilities of the LDM and the component model. The RR Object Controller 250 may also interface with a security guard 290 to provide security to the communication.

In the illustrated example of FIG. 2, request and response messages are sent using standard Hypertext Transfer Protocol (HTTP) over a Transmission Control Protocol/Internet Protocol (TCP/IP) socket connection. In some embodiments, the request and response messages can be sent to a web client 260 through a web server 262.

In addition to the standard message packet format defined by the chosen protocol (e.g., TCP/IP), each message has a defined message wrapper or header, and data payload. The message header provides security and identification information, while the data payload includes the actual request or response data in the form of serialized components from the LDM.

The distributed system and the Logical Data Model can be extended to add more services and interfaces without having to modify the communication layer because the ability to serialize components is independent of the communication layers. Connections to the server may be made over a variety of communication media, and the distributed system will support access and configuration using a standard web browser interface. The distributed system will also allow access from a range of mobile devices. Typically, the connection to the mobile device will be over a wireless connection.

Wireless connections generally offer relatively low bandwidth compared to that available to wireline connections, such as DSL, Cable modems, ISDN, and T1. Moreover, the wireless connections may be unreliable both in terms of coverage as well as in terms of signal quality. Outside of metropolitan areas, wireless coverage may be non-existent, or may only be available along major highways. Even in coverage areas, the wireless connections may drop out due to poor signal strength or holes in the coverage area. To compensate for this degradation, the RR protocol supports mechanisms that allow retrying and resending of the lost messages. The RR protocol also supports mechanisms that enable the ability to break larger requests and responses into smaller chunks. Using serialization techniques, data packets are partitioned into smaller chunks such that the recipient may start to use the data once the first chunks have been received without having to wait for the remainder of the data packets.

Request-Response Protocol

The RR protocol maintains a messaging state mechanism that facilitates the ability to send and receive requests and responses in any order, through one or more physical connections. The system 200 is designed to allow a client device 202 to make a sequence of requests, and to receive the responses from the request order. The protocol also allows multiple requests to be aggregated into a single composite request object. In various embodiments, requests may have no associated response, and a response may not have a single request from which it originated. Multiple responses from a single request may be transmitted and/or received in any order.

The RR protocol, described in detail below, defines a data sequence, including a header, a body, and a trailer. The header is used to uniquely identify the particular message within the system. The header includes a unique message identifier and a protocol header. The message identifier identifies the sender and the request. The protocol header provides version or format information about the contents of the body. The body includes the actual message or messages (i.e., request and/or response). The trailer carries a termination value to indicate the end of the message.

An exemplary unique message identifier, shown in Table 1, includes a sender identification (ID), a time stamp of when the message was sent, and a message ID generated by the sender. A chunk ID can be added optionally.

The sender ID is a 128-bit value representing the IP address assigned to the client when communicating on a TCP/IP network, and representing the subscriber number assigned by the service provider when the client application is first installed. The time stamp represents the transmission time (e.g., in milliseconds) of the message. The Message ID is a unique identifier generated by the sender. Various techniques are used to ensure that Message ID's are unique. On the client side, a count or a fixed number can be used for each message type. When the fixed number is used, care is taken to ensure that no overlapping messages are sent. On the server side, a central number generator, such as a sequence generator in a database, can be used. The Chunk ID is typically an index value indicating the position of the chunk in the overall message stream.

TABLE 1

| Sender ID | Time sent | Message ID | Chunk ID |
| --- | --- | --- | --- |
| (128 bits) | (64 bits) | (64 bits) | (31 bits + 1) |

An exemplary protocol header, shown in Table 2, is configured as a 16-byte data sequence. The first byte of the protocol header specifies the major version number of the protocol, followed by a minor version byte, which together indicates the full version of the protocol. The next two bytes are reserved. Following the protocol version information, the transmission time of the request occupies the next four bytes. This is followed by a 128-bit long sender identifier described earlier.

TABLE 2

| Protocol header | | | | | |
| --- | --- | --- | --- | --- | --- |
| 4 bytes | | | 4 bytes | 4 | 4 |
| Major Version (8-bit) | Minor Version (8-bit) | N/A (16-bit) | Time sent | Sender ID | |

The RR protocol allows transmission of more than one message within each connection stream to facilitate multiplexing messages over one connection. Therefore, each message is preceded by a message header. The configuration of the message header is shown in Table 3.

TABLE 3

| Message header | | | | | | | | | Optional | | | |
|---|---|---|---|---|---|---|---|---|---|---|---|---|
| 4 bytes | 4 bytes (32 bits) | | | | | | | | 4 bytes | 4 bytes | 4 | 4 | 4 |
| Message ID | Message Type (4) | Priority (4) | Compress Method (4) | Serializer ID (4) | Not Applicable (12) | Response Flag (1) | Chunk Flag (1) | Key Flag (2) | Request Message ID | End Flag (1) | Chunk Index (3) | Assymm Encrypted Key |

The message header includes a four-byte message ID that uniquely identifies the message. The message header also includes a message type value, a priority value, a compression method value, a serializer ID, a response flag, a chunk flag, and a key value.

The message type value indicates the message type. Exemplary message types include session negotiation, termination requests, and service requests and responses. The priority value is a value between 0 and 15, where the value 15 represents the highest priority. This value influences the Quality of Service (QoS) of the following message. The compression method value indicates the compression technique used to compress the message contents. The serializer ID specifies the method that is used to serialize the message body. The response flag is provided to indicate that this message is the response to a specific request. Thus, if set, the message ID from the request that generated this response is appended to the header. The chunk flag indicates that the message is part of a chunked stream. If this flag is set, an end flag and a chunk index are appended to the header. The key value is used to indicate whether the message has been compressed, and indicate the level of compression. A value of zero indicates that no encryption was performed; a value of one indicates 64-bit encryption; a value of two indicates 128-bit encryption; and a value of three indicates 168-bit encryption. The public key is appended to the end of the message header.

The message header is followed by the message body, which is a serialized version of component representation of a request or response. Optionally, the message body can be compressed and/or encrypted. The component serialization protocol handles the serialization of the message components. The output format of the serializer may be plain Extensible Markup Language (XML), the Simple Object Access Protocol (SOAP), or a proprietary text or binary format. A deserializer on the recipient side reconstructs the serialized request/response component by reading the serialized data stream, and dynamically constructing the serialized components. The deserializer independently stops reading at the end of the serialized message body. Data integrity of the message body can be checked by using an Adler-32-bit checksum.

Server Session Management

Referring to FIG. 2, a session manager 280 in the server 204 creates a session object with a unique ID for each logical connection with the client device 270. The session includes a cache of information 282 relating to the transactions between the client 202 and server 204. For example, the session cache 282 may include current request and response information to facilitate retry and resend functionality. Session contents are then discarded when the session terminates. However, in the distributed navigation system 200, session states are generally kept in memory for extended periods, such as for the duration of a route that the client is following. Therefore, to support this extended storage of session states, the distributed system 200, in one embodiment, maintains a hybrid session management system in which session information is stored in a longer-term storage, such as a Relational Database Management System (RDBMS).

The RR protocol defines a mechanism that supports the ability to add new or change existing requests and responses dynamically, without interrupting the server or breaking existing client interfaces. This mechanism includes Meta-Data information that describes the serialization format and content of message packets. Thus, once a client has been authenticated, and initiated a session with the server, the client sends a message describing the versions of the current Meta-Data schema. The server matches the received message against the current version, and responds with updated versions where appropriate. The serializer/deserializer then uses these schemas when writing and/or reading the message body data stream. The Meta-Data schemas are provided for all components within the LDM that may be serialized or transmitted as part of a request-response cycle.

The request and response message types in the RR protocol include session establishment requests and responses; session termination requests; Meta-Data requests and responses; service request and responses; exception responses; ping requests and responses; response cancellation requests; response resend requests; and composite requests and responses.

The session establishment requests and responses allow opening a connection on the server and establishing a dedicated session for a specified client. Sending the opening request requires authentication information to be included. Otherwise, a session cannot be established and an exception response is returned. Closing a session only requires sending a session termination request, which is a one-way message with no expected response.

The Meta-Data requests and responses allow the synchronization of serial Meta-Data and published service information. The client transfers existing information to the server using the Meta-Data request. The server uses a specified service to synchronize the data and returns only the information that is different. The service request and responses allow the client to dispatch method invocations. The exception responses are used to the client propagate any exceptions generated on the server while attempting to process client requests. If the exception cannot be transferred, the exception component may form only a string indicating the exception message. The exception responses may be formed differently depending on where the error occurred.

The ping requests and responses allow the client to ping the server to test the connection with the server. These messages also allow the client to retrieve information about the network traffic and the server congestion.

The client may use the response cancellation requests to cancel a pending request. The response cancellation request may be issued as a result of a timeout condition or a pending request being superceded by a subsequent request. Thus, the cancellation request can be used to limit unnecessary data traffic over limited bandwidth connections.

The client may use the response resend requests to order the retransmission of the missing response when the client is missing a response due to network problems or client execution problems. The resend request may be wrapped into a composite request message. For example, the client may keep a list of calculated routes that are associated with particular response ID's. Using these ID's, the client can request that the routes be re-sent. It is also possible to retrieve specific chunks of a message by specifying the lower and upper bound chunk indices. In the case where a connection drops, the client may request specific chunks of a response message.

The composite requests and responses are combinations of different requests and responses, and include child messages. Since a composite message has no global values that can be accessed, all messages contained in the composite message are independent. One exception to the independence of the messages is that requesting the opening of a session and the invocation of a service within the same composite message makes the service request part of the session context. Messages contained in the composite message are executed in the order in which the messages are declared. Moreover, the server can decide if the responses generated for the requests are returned separately in a single message or within several different composite messages. Thus, the composite requests and responses may speed up the transfer of data, if the data to be transferred is small. Since the composite message does not have a unique message ID, the message may not be cancelled or retrieved.

Server Request-Response Management

Referring again to FIG. 2, the architecture of the distributed navigation system 200 allows flexible management of server requests and responses such that reading requests from any arbitrary stream and writing responses to a stream becomes highly configurable. Request handling should enable handling of messages that are received in any arbitrary order, whether those messages generate responses or not. Moreover, it should be possible to add new message handlers without distorting the system architecture. The architecture should also allow configuration of how (and how many) responses are dispatched for a request, and be highly scalable and maintainable.

Accordingly, the management of server requests and responses in the architecture of the distributed navigation system 200 employs asynchronous message handling based on an event-driven design model. In particular, the architecture of the distributed system 200 is based on Staged Event-Driven Architecture (SEDA) described in an article by Matt Welsh. The SEDA technique describes a method of decomposing a complex, event-driven application into a set of stages connected by queues. This technique avoids the high overhead associated with thread-based concurrency models, and decouples event and thread scheduling from application logic. By performing admission control on each event queue, the service can be well conditioned to load. This prevents resources from being over committed when demand exceeds service capacity. The SEDA technique also employs dynamic control to automatically tune runtime parameters (such as scheduling parameters of each stage), and to manage load (e.g., by performing adaptive load shedding).

Decomposing services into a set of stages enables modularity and code reuse. The decomposition also enables the development of debugging tools for complex event-driven applications. The basic pattern of the SEDA design is the stage, which includes a source event queue. The stage employs one event handler that handles events from the current queue and queues outgoing events onto subsequent stages source event queue. From the perspective of the current stage, the subsequent stages event queues are called sinks. A thread pool manager attaches threads to a stages event handler. There are two strategies for allocating the threads. The first strategy includes allocating one thread per processor per event handler, while the second strategy includes employing one thread per sink.

Figure 4:
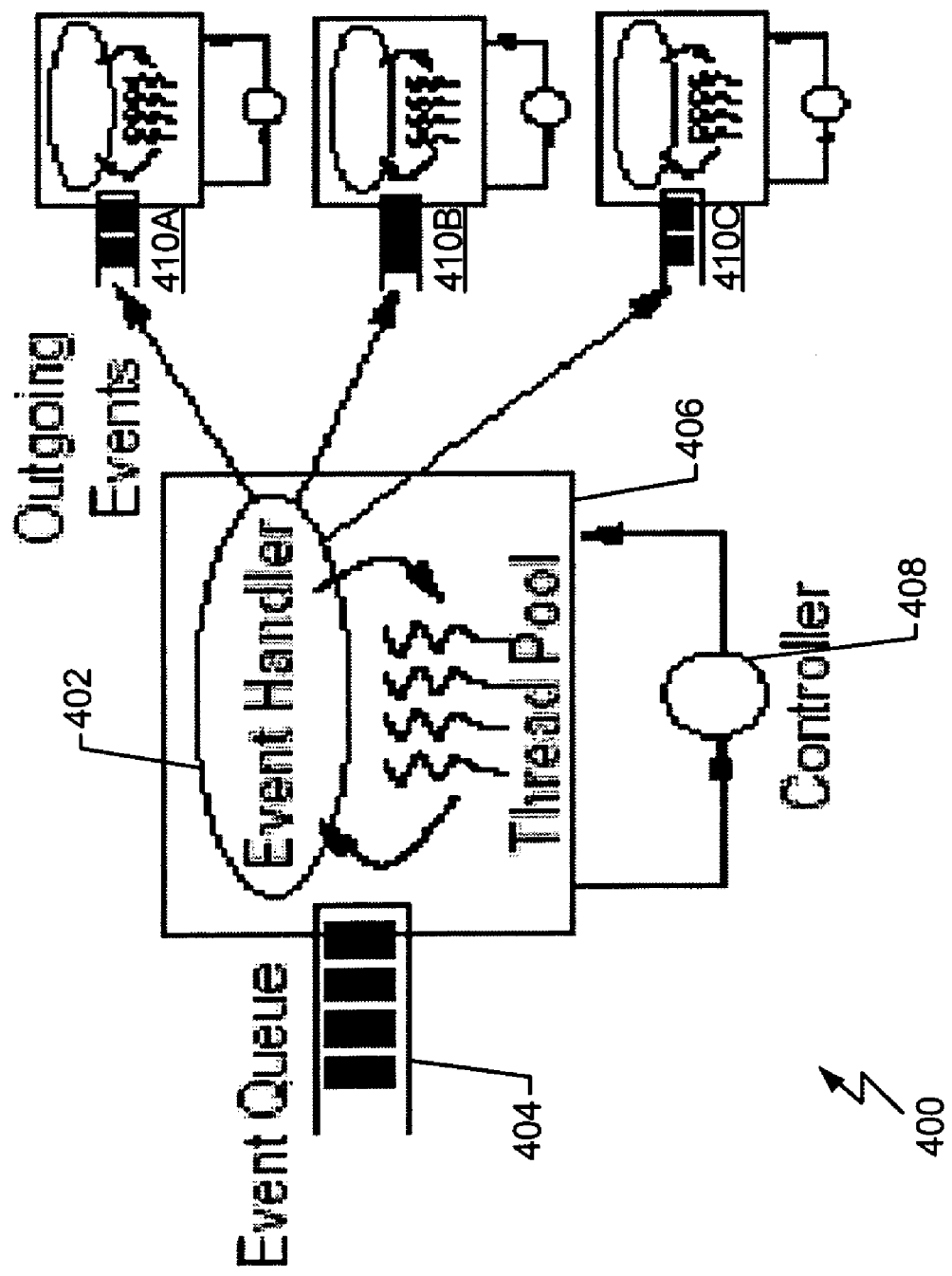
FIG. 4 illustrates an exemplary stage that is a fundamental unit for a SEDA design.

FIG. 4 illustrates an exemplary stage 400, which is a fundamental unit for a SEDA design. The stage 400 is a self-contained component including an event handler 402, an incoming event queue 404, a thread pool 406, a controller 408, and a set of outgoing event queues 410. The event handler 402 processes batch of events, signals more events, and places the processed events on the outgoing event queues 410. Each stage components has an associated event handler that is configured by a stage configuration file. This allows the event handler to be easily replaced, even during production, should it be necessary. The stage has an associated incoming event queue and several outgoing queues. The controller 408 controls the thread pool 406 and event batching. The controller 408 also observes runtime characteristics of the stage, and adjusts resource allocation and scheduling to meet demands.

Figure 5:
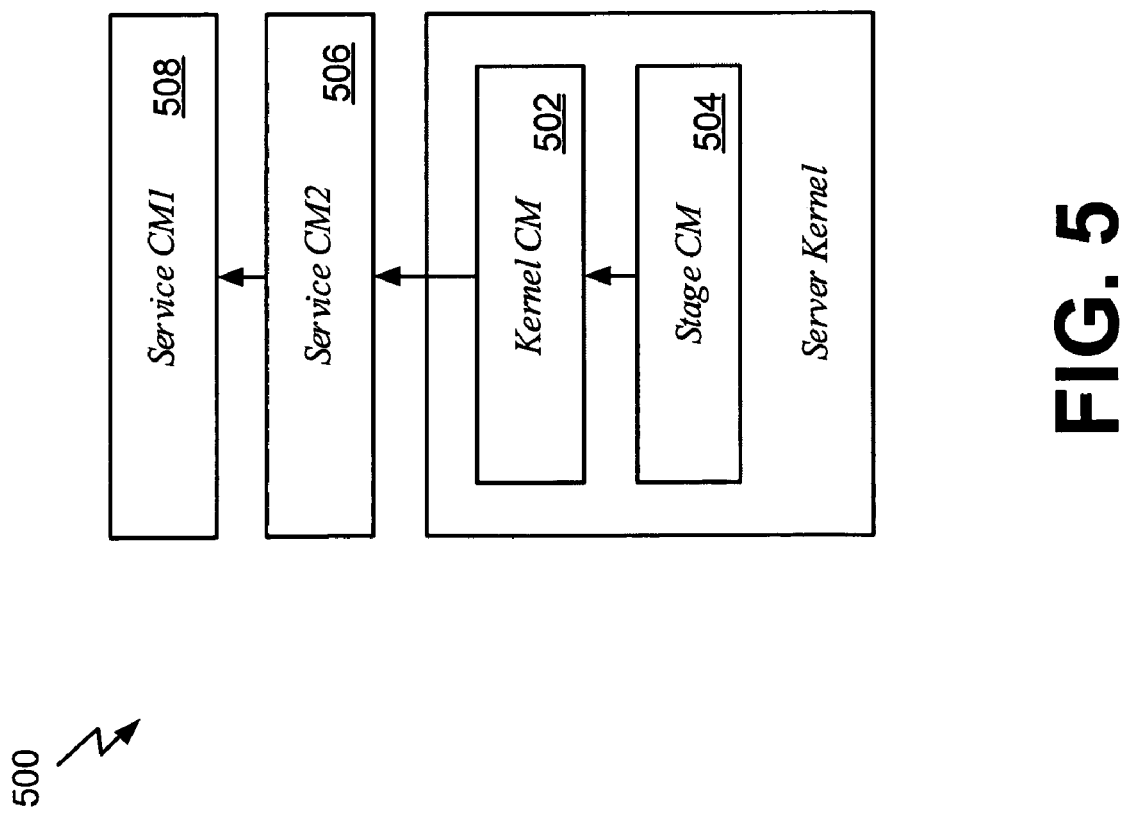
FIG. 5 illustrates a server kernel in accordance with an embodiment of the present invention.

FIG. 5 illustrates a server kernel 500 in accordance with an embodiment of the present invention. The server kernel 500 includes two component containers, which form the base server engine. The containers are inaccessible for any deployed component/service. The kernel service manager 502 includes all components that are necessary to run the system, such as the serializing and deserializing services. The stage component manager 504 manages the stages of event flow. Thus, the stage component manager 504 can access the kernel components, but the kernel components are unable to observe the event flow of the system.

Services, identified by service roles, are deployed in one or more service managers 506, 508 situated above the kernel. Each service manager (SM) is aware of the parent, and if a service role is not found within a particular SM, the parents are searched recursively until either the role is found or the search completes with no match. If no match is found, then a processing exception response may be sent to the client whose request initiated the service call.

Referring again to FIG. 2, the lookup registry 242 is used to find an appropriate container for a specific service, where the registry 242 includes service registration and discovery information. Each component manager maintains a list of installed services, and the list is registered with a service publishing component that is accessible from the request response layer. This list is a master list of all installed services, their descriptions, the set of available methods provided by each, and the component manager where the service may be found. Services are identified using a unique service ID.

Figure 6:
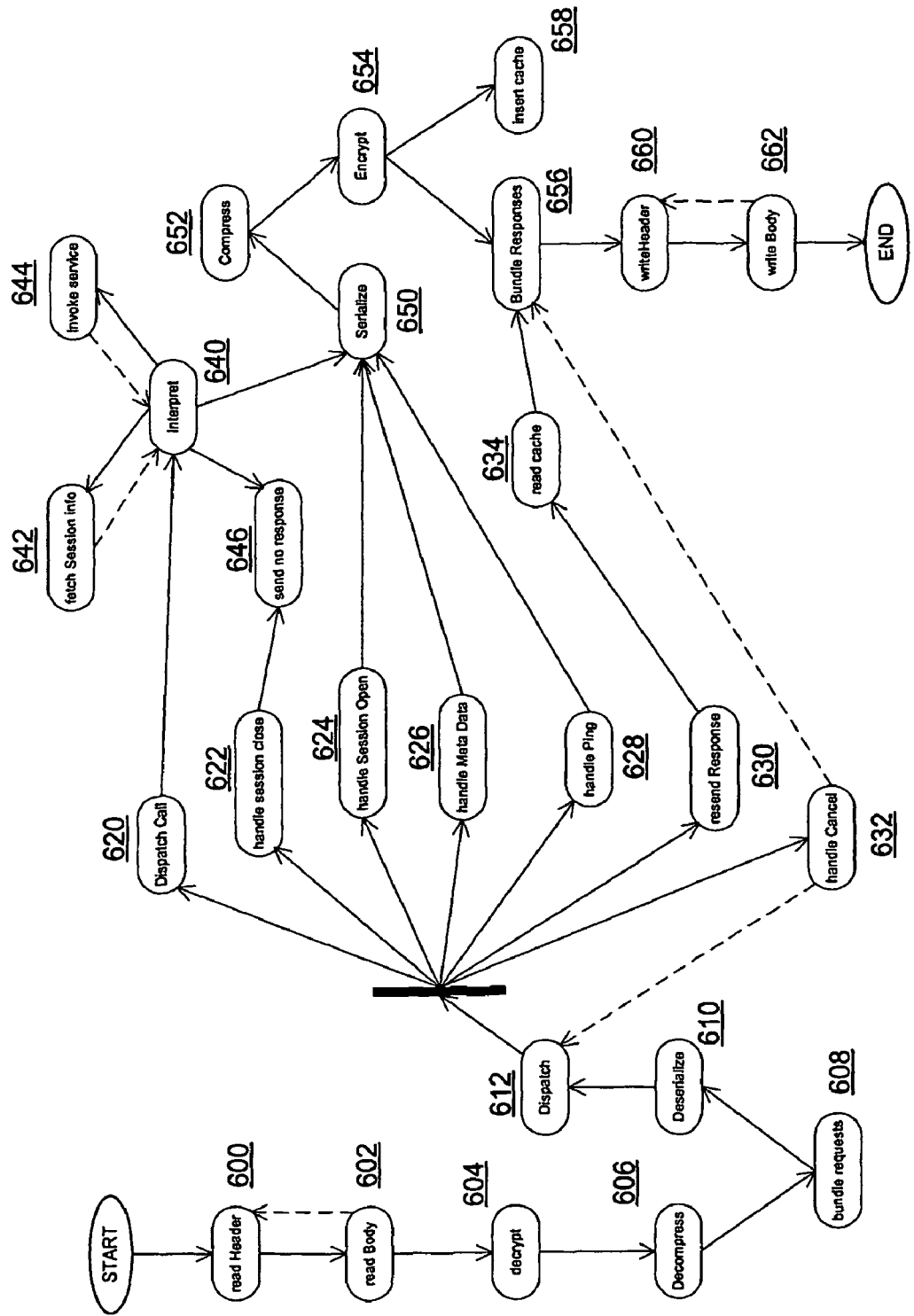
FIG. 6 illustrates tasks required to process requests in the context of the stages and event handlers in the server kernel.

FIG. 6 illustrates tasks required to process requests in the context of the stages and event handlers in the server kernel. For clarity, underlying network communication processes, such as reading from or writing to a stream has been omitted.

The initial task is to read the header of the request and generate a header object from the information, at 600. The body is then read, at 602, and both header and body are passed on for processing. If more message bodies follow, then the process is repeated until all messages are read.

The next task is to process the request. If required, request messages are decrypted (at 604), decompressed (at 606), and bundled (at 608) for deserialization (at 610). The request is then dispatched, at 612, to the appropriate request handler.

Once a call is dispatched, at 620, the call is interpreted (at 640). The call interpretation, at 640, may require fetching session information (at 642) and invoking service (644). The call interpretation requires no response, at 646.

Request event handlers 620–632 handle all requests, including dispatching a call (at 620), opening and closing sessions (at 624 and 622, respectively), synchronizing Meta-Data information (at 626), pinging (at 628), resending responses from the response cache (at 630), service requests and cancellations (at 632).

After handling the specific request, the response is serialized (at 650), compressed (at 652), encrypted (at 654), and queued up for bundling as a response (at 656). A bundled response is then written to the stream by writing the header (at 660) and the body of each message (at 662).

Because of the nature of the wireless connection, the client may experience dropped connections. Thus, to support resend capability when the connection is dropped, the response is also copied into the session cache (at 658). The responses can be kept in a binary form in the cache for a duration defined by a components cache configuration file, for the duration of the session, or until a cancellation request has been received. A client may request that a particular response be re-sent by sending a resend request with the request ID used to generate the original response. If a resend request is received, the response is read from the cache, at 634.

To cancel a request, the client sends a specific response cancellation request (at 632) specifying the header information of the original request. This information and in particular the unique message ID are used to mark the request as cancelled. A dedicated request handler 632 handles the response cancellation request. The handler 632 has access to the outgoing response queue and the incoming request queue bundling stages. To stop the processing of a specific request, the handler queues a cancellation event in both stages queues. Each stage is responsible for evaluating this cancellation request and invalidating the original response (request). If the response has already been sent, the handler will also clean the response cache.

Client Data Caching

One of the features of the distributed navigation system is a cache of information on the client. In order to make best use of the available bandwidth and client storage space, the cache configured to highly target the needs of the client. Moreover, the cache is updated only when necessary, and as efficiently as possible. The cache size depends on the available storage of the client device, which may take the form of a mass storage device, such as a hard disk, a compact flash, or a memory-based solution.

Cached data is used in preference for operations on the client device. For example, in a distributed navigation system, when the user requests a database search (e.g., for a point of interest lookup), the client will use the cached data if the search region is already held in the cache. Thus, no client to server transaction needs take place. If the data is not held in the cache, or is only partially held in the cache, then the client can make a request to the server. Depending on the request, the client may receive an additional data set, or may receive only the results of the search from the server.

The client cache can be preloaded with an initial data set during installation, which can be based on a rough approximation of the data set that the client is expected to use. For example, the default data set may include the geographic area that is expected to be used by the client. If the usage of the client reaches the limit of the cached data set, the client can request additional blocks of data from the server, such as additional regions of map database. The client can track the usage of data within the cache, and once the cache size has grown to the limit of the allowed boundary, the least used cache data can be discarded.

The distributed system imposes a regular structure on the data that the client holds in the cache to allow the client to manage structured blocks of data rather than individual data objects. Although imposing structure can result in the cached client data being only partially used, the management of data cache can be significantly simplified. For example, the cache can hold a number of regions of map data, each region containing many objects, such as road segment, node information, POI information, and other related objects. However, the client can hold or discard complete regions rather than individual segments and nodes, which results in client needing to manage only a few objects. The cached data may also be replaced or updated, if the data becomes out of date. For example, if the master mapping database is updated with newer information, the clients may also update the data held within the cache.

Parcelization

For efficient use of the available bandwidth, a distributed navigation system includes a mechanism that breaks the total data space into smaller manageable blocks that can individually be cached by the client. The choice of block size takes into account of the distribution of data objects within the data space and the storage capabilities of the client devices.

In one embodiment for breaking down the total data space into smaller blocks, the total data space is divided into regions based on natural boundaries within the data space. For example, the data space includes mapping data, which is broken down into regions based on national boundaries, landmass boundaries, or administrative boundaries (e.g., state or county). The mapping data can also be broken down based on the contained data by either density or total contained objects. Each resulting region is then allocated a unique ID.

The regionalization schema of the data space is regular and describable so that there would be conformity between the client and server. The schema may be described by a set of bounding rectangles or polygons. Furthermore, the schema has an associated version, such that when the client communicates with the server, the server can detect the schema version used by the client and update the client if required.

Once the data space is divided into regions, each region can then be further divided into smaller parcels using a regular and describable schema. For example, a parcel can be divided into a number of equal-sized parcels, and the schema for each parcel may be described by specifying the width and height of a single parcel or by specifying the width and height of the region in parcels (from which, using the total region size, the individual parcel size may be derived). This schema is versioned such that the client and server can maintain synchronization.

Each parcel will be allocated a unique ID, as well as a version stamp that reflects the state of the data within the region. As the master database is updated on the server, the changes made to each parcel are examined. The parcel version stamp is changed to reflect these changes. The version stamp may encode an indication as to whether objects within the region have been added, modified, or deleted. When the server detects a client with an out-of-date parcel within its cache, the server may use this version information to decide whether to issue a complete new version of the parcel or whether the server can provide a set of delta changes to the client for bootstrapping.

During subdivision of regions into parcels, the parcels may be discovered to have no contents or be very sparsely populated. In the case of parcels with no contents, a NULL version stamp may be assigned. In the case of very sparsely populated parcels, the content of the parcels are promoted to adjacent parcels. This may also be indicated in the parcel version stamp.

The parcel size is chosen to optimize the parcel size against the limitations of the communication channel and the client storage capability. This is generally a balance between the maximum data density in the specified region against the communication bandwidth. Different regionalization and parcelization schemas are used for different classes of client within the distributed navigation system.

Figure 7:
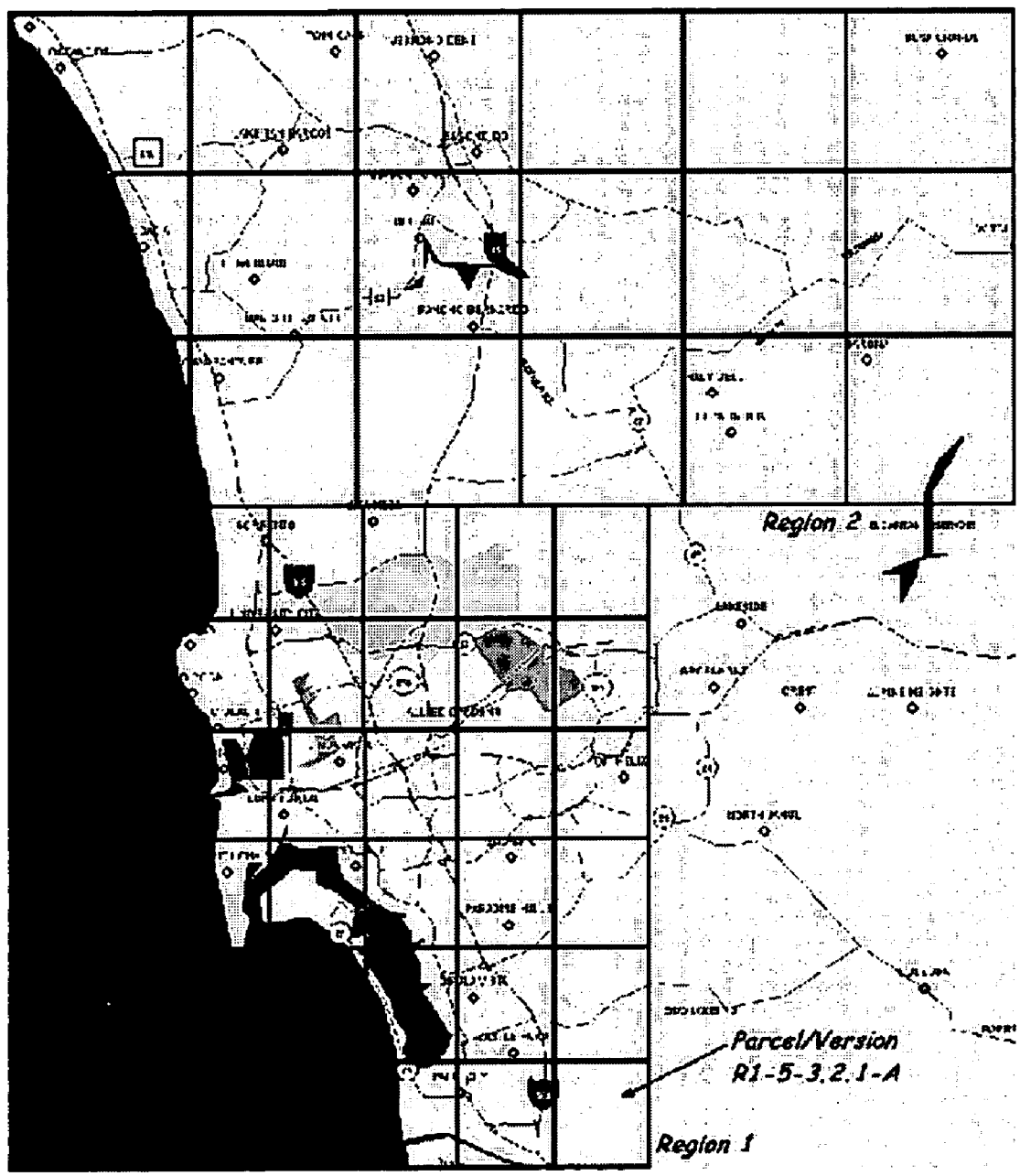
FIG. 7 illustrates an example of regionalization and parcelization.

An example of regionalization and parcelization is shown in FIG. 7. Given the structure of the parcelization scheme, the client can manage the data within the cache on a parcel-by-parcel basis. Each parcel within the client cache can have some usage metrics applied. This can take the form of a 'most recently used' list and/or a usage count, such as number of uses over a timed period. As the client travels within the parcelized data space, a set of parcels that closely match the areas most frequently used can be built.

Given that the regionalization, and parcelization structures are regular, the server may pre-compile parcel data packets for download to clients rather than build them on-the-fly as clients request them. The parcels may also be made available for use through a higher bandwidth connection. For example, during client installation, the parcels may be installed from a CD or through a higher bandwidth connection, such as a Bluetooth or 802.11 wireless connection.

Serialization and Chunking

Data in the system is generally transmitted between the client and server as a serialized object stream to optimize both the compression that can be applied to the stream and the expected use of the data. For example, when sending a route corridor around a generated route from a server to a client device, the corridor is serialized sequentially along the length of the route. As the client deserializes the received data and constructs corresponding objects, the client is able to immediately utilize the received objects without having to wait until the entire object stream has been received.

The client and server typically use different data model because of the differences in storage and processing capabilities between the client and server. For example, on some client devices it may be possible to omit certain attribute information for data objects if the client is not required or is unable to use the information. Thus, different versions of the defined data objects are maintained for each class of device. The data model used for serialization is different as it provides another representation of the data objects.

The data stream can be serialized using a number of compression and compaction techniques. The output can then be passed through a generic compression technique (e.g., a technique such as the "ZIP" technique) to provide further compression. Since most of these generic compression techniques will require that the whole block of compressed binary data be received before any decompression is possible, each set of objects may be broken down into smaller chunks with each chunk representing a partition of the parcel data space. These chunks can be chosen based on an understanding of the purpose of the data usage so that the contained objects will have some relational significance. Each chunk of data is then serialized and compressed for transmission.

An example of chunking includes the route corridor technique previously described. If the corridor is large due to the complex nature or length of the route, then the corridor can be broken down into logical chunks based on sequential distance along the route or proximity to maneuver points. This enables the client to quickly receive a set of data that can be used without having to wait for other data, which holds information related to map area that is considerable distance away.

System Applications

The distributed navigation system can be used in many different system applications. However, the distributed system can also be used for traditional navigation purposes with the added benefits provided by the ability to maintain a connection to a server. Typical navigation functionality would include address resolution and geocoding, route calculation and maneuver generation, and support for rendering maps on the client. The map rendering can be done either by supplying rendered data (vector or raster) from the server or by providing map data directly for a client use. Vehicle positioning for client navigation purposes will typically be performed on the server due to the latency and unpredictability of the wireless connection.

A wireless connection between the client and server allows a service provider to highly customize their service offering. Additional access to various third party services or data providers and enhanced point of interest database can be provided to one or more customers. This may be done on a per use or subscription basis. A connection between the client and server also allows the client to receive traffic information. This may involve traffic incidents, including effects and extent of the traffic incidents, and measured or estimated traffic flow. Due to large volumes of data, most clients will not have the storage capabilities to store profiled or predictive traffic flow information. However, this information is highly valuable when calculating routes as it enables the route calculation technique to much more accurately estimate the driving time of the route.

The client may query for specific predictive values for road segments based on expected time of arrival. However, the client may simply allow the server to calculate the best route and then make use of the on-board database to guide the client along the route. The "best" route can be specified by the user as either shortest distance or quickest time between points, or a default "best" criteria can be used by the device. The connection between the client and server may be viewed as a two-way link. Using mobile clients as data sources, traffic flow and density can be measured by reading position information from the clients. This may be done to better model the effect of traffic incidents on surrounding traffic flow. This may also be used adaptively to affect subsequent route calculations. By monitoring actual traffic flow; dynamic traffic management systems may be able to influence traffic conditions by actively providing suggestions to mobile clients about the best route.

While it is not expected that vehicle positioning for navigation purposes will be performed in the server, a connection between the client devices and the server allows a server to roughly track the position of a client device. This feature may be used for a number of commercial purposes. For example, the vehicle may be tracked for rental fleet management, vehicle dispatching, and vehicle recovery. The system can also be used for location tracking of children by parents.

The wireless connections may be integrated into the vehicle security system. This configuration can allow the driver to be remotely authorized prior to entering or using the vehicle. For example, this configuration can be used to control access to rental cars.

A wireless connection connected to the vehicle management system will allow manufacturers and service centers to monitor the vehicle characteristics and performance. This configuration would improve the ability to detect problems earlier, and generally lead to a better Quality of Service (QoS) and reduced warranty costs for both manufacturers as well as consumers. With the inclusion of an on-board or server based navigation map information, additional information may be added to the existing service log information. For example, the vehicle may log the quantity and proportion of freeway, urban, and rural driving. It could also log altitude and speed profiles, as well as geographic driving distribution. This information should improve the vehicle manufacturers' understanding of how the vehicle fleet is actually being used, which leads to better QoS.

A computer system can be used in conjunction with the LDM described above to produce a distributed navigation system device, such as the client and server devices described above. In this way, the LDM can be used as a toolkit to execute a software build process that results in a client or sever application for the distributed navigation system. Those skilled in the art will understand how to use the LDM in conjunction with component programming techniques to implement a software build process that provides the functionality described above. The description provided below provides further description of considerations involved in the process.

The first operation in executing a software build process will be to determine the device communications and user interface features unique to the application that is to be produced. This operation involves the specification of appropriate Server Communications interfaces between the LDM and the devices on which the application is to be executed. Information about the interfaces is provided above in the description relating to FIG. 3.

Thus, the core functionality of a distributed navigation system has been described above. Any one of the navigation services (such as depicted in FIG. 3) can be substituted with a proprietary or other independent source for the service. Each service can be separately updated, tested, debugged, and otherwise modified without affecting the operation of the other services. For example, to provide a navigation system application, a developer need only provide a suitable user interface to permit communication by a user with the core services. The other services can be configured according to desired behavior and then deployed during runtime or in a software build process.

The present invention has been described above in terms of exemplary embodiments so that an understanding of the present invention can be conveyed. Any embodiment described herein as "exemplary" is not necessarily to be construed as preferred or advantageous over other embodiments. Moreover, there are many configurations for the distributed navigation system not specifically described herein but with which the present invention is applicable. The present invention should therefore not be seen as limited to the particular embodiments described herein, but rather, it should be understood that the present invention has wide applicability with respect to distributed system generally. All modifications, variations, or equivalent arrangements and implementations that are within the scope of the attached claims should therefore be considered within the scope of the invention.

We claim:

1. A navigation system comprising:
   a computing device that has a programming memory loaded with a component-oriented application providing navigation services, the computing device including:
      a logical data model configured to provide abstract interfaces in a process to convert a format and data model of a provider to an appropriate format and data model suitable for the computing device,
      wherein the process occurs on demand, only when needed, or the conversion occurs in accordance with the format and data model of the provider, and at download time or at an initial processing time.

2. The system of claim 1, wherein the computing device further includes
   a service manager component;
   a user positioning category of components that provides a user position based on navigation sensor data;
   a mapping category of components that accesses a map database and places the user position on a road segment of the map database,
   wherein the service manager component provides an interface to query and receive instances of specific services offered either locally or from a remote server.

3. The system of claim 2, further comprising:
   a route processing category of components that provides a route from a given starting point to a destination point, and maneuvers for the route, and
   an address processing category of components that provides a list of destinations and enables a user to perform name entries and searches on a limited name sets by performing next character searches.

4. The system of claim 3, wherein the route processing category of components includes one or more of a route maneuver expansion component, and a route guidance component, wherein the route maneuver expansion component expands maneuvers with detailed description of the maneuver based on a turn angle and a maneuver type, and the route guidance component is configured to guide a user on route, and to determine if the user is on the route.

5. The system of claim 3, wherein the route maneuver expansion component is configured to associate sound files and/or bitmaps to each maneuver.

6. The system of claim 2, wherein the address processing category of components includes one or more of a custom destinations component, and a name lookup component, wherein the custom destinations component provides a list of destinations stored on a server, and the name lookup component enables a system client to perform name entries and searches on a limited name sets.

7. The system of claim 6, wherein the name lookup component includes an interface to perform next character searches.

8. The system of claim 1, further comprising one or more of:
   a traffic service component that provides a real-time traffic data from a remote service;

a messaging services component that provides internal communication between components; and a server communication component configured to provide request and response mechanism to communicate with the remote server.

9. The system of claim 1, wherein the user positioning category of components includes one or more of a GPS service component and a navigation sensor component, wherein the GPS service component provides GPS data, and the navigation sensor component provides navigation sensor data.

10. The system of claim 1, wherein the mapping category of components includes one or more of a map matching component, a map display component and a map data access component, wherein the map matching component places the user position on a map database road segment, the draws a map having entities representing different visible objects on the screen, and the map data access component provides an interface to access the map database.

11. A method of providing a navigation application from a computer system that supports an object oriented programming environment, the method comprising:

providing a logical data model configured to provide abstract interfaces in a process to convert a format and data model of a provider to an appropriate format and data model suitable for the computing device, wherein the process occurs on demand, only when needed, or the conversion occurs in accordance with the format and data model of the provider, and at download time or at an initial processing time.

12. The method of claim 11, further comprising providing a plurality of components that include:

a service manager component;

a user positioning category of components that provides a user position based on navigation sensor data, a mapping category of components that accesses a map database and places the user position on a road segment of the map database, wherein the service manager component provides an interface to query and receive instances of specific services offered either locally or from a remote server.

13. The method of claim 11, wherein the components further comprises:

a route processing category of components that provides a route from a given starting point to a destination point, and maneuvers for the route, and an address processing category of components that provides a list of destinations and enables a user to perform name entries and searches on a limited name sets by performing next character searches.

14. The method of claim 11, wherein the components further comprises:

a traffic service component that provides real-time traffic data from a remote service.

15. The method of claim 11, further comprising:

providing internal communication between components via a messaging services component.

16. The method of claim 11, wherein the components further comprises:

a server communication component configured to provide request and response mechanism to communicate with a server, wherein the response mechanism includes techniques to process request messages.

17. The method of claim 16, wherein the techniques to process request messages include:

interpreting the request messages;

dispatching calls to request event handlers to handle the request messages;

preparing a response to the request messages, such that distributed navigation data is collected and processed; and transmitting the response to a client, wherein the client can process the received navigation data in the response into a presentable form.

18. The method of claim 17, further comprising:

deserializing the request messages if the request message is serialized.

19. The method of claim 17, wherein the interpreting of the request messages includes fetching session information.

20. The method of claim 17, wherein the interpreting of the request messages includes invoking services.

21. The method of claim 17, further comprising one or more of:

storing the response into a session cache;

encrypting and compressing the response; and serializing the response.

22. A navigation system comprising:

a computing device that has a programming memory loaded with a component-oriented application providing navigation services, the computing device including:

a service manager component;

a plurality of service components that implement abstract, provider and algorithm independent interfaces, that communicate between each other; and the rest of the system through those abstract interfaces;

wherein the service manager component provides an interface to query and receive instances of specific services offered either locally or from a remote server.

23. The system of claim 22, wherein the service components are configured through configuration objects that can be loaded from a storage, from the network or set programmatically.

* * * * *